US00RE42580E

(19) United States
(12) Reissued Patent
Olson

(10) Patent Number: US RE42,580 E
(45) Date of Reissued Patent: Aug. 2, 2011

(54) PACKAGE WITH AN OPENING FORMED THEREIN

(75) Inventor: Christopher R. Olson, Hudson, WI (US)

(73) Assignee: S.C. Johnson & Son, Inc., Racine, WI (US)

() Term: 14 Years**

(21) Appl. No.: 29/332,239

(22) Filed: Feb. 11, 2009

Related U.S. Patent Documents

Reissue of:
(64) Patent No.: Des. 558,044
Issued: Dec. 25, 2007
Appl. No.: 29/278,025
Filed: Mar. 16, 2007

(51) LOC (9) Cl. ..... 09-03
(52) U.S. Cl. ..... D9/418
(58) Field of Classification Search ..... D9/414–432; 206/733, 769, 773, 775–777, 781–783; 229/162.1, 229/162.3, 162.6, 162.7
See application file for complete search history.

(56) References Cited

U.S. PATENT DOCUMENTS

| | | | | | |
|---|---|---|---|---|---|
| D98,468 | S | * | 2/1936 | Wandel | D9/432 |
| D157,080 | S | * | 1/1950 | Opler | D9/418 |
| 3,033,357 | A | * | 5/1962 | Vogel | 206/574 |
| D201,317 | S | * | 6/1965 | Tamarin | D9/418 |
| D283,309 | S | * | 4/1986 | Caldwell et al. | D9/416 |
| D297,415 | S | * | 8/1988 | Gavin et al. | D9/416 |
| D305,204 | S | * | 12/1989 | Reifein et al. | D9/761 |
| D314,914 | S | * | 2/1991 | Callinan | D9/432 |
| D319,185 | S | * | 8/1991 | Ferrero | D9/415 |
| D323,986 | S | * | 2/1992 | Ferrero | D9/418 |
| D373,080 | S | * | 8/1996 | Prosperi et al. | D9/418 |
| D432,415 | S | * | 10/2000 | Teasdale et al. | D9/418 |
| D446,113 | S | * | 8/2001 | Steinfels | D9/418 |
| D469,349 | S | * | 1/2003 | Meeker et al. | D9/418 |
| D472,141 | S | * | 3/2003 | Buschkiel et al. | D9/734 |
| D494,060 | S | * | 8/2004 | Izen et al. | D9/418 |
| D502,392 | S | * | 3/2005 | Maher et al. | D9/418 |
| D513,382 | S | * | 1/2006 | Proudfit | D9/415 |
| D528,906 | S | * | 9/2006 | Harper et al. | D9/418 |
| D534,419 | S | * | 1/2007 | Hermkens et al. | D9/418 |
| D536,960 | S | * | 2/2007 | Harper et al. | D9/418 |
| 2007/0020433 | A1 | | 1/2007 | Gruenbacher et al. | |

* cited by examiner

*Primary Examiner* — Susan E Krakower

(57) CLAIM

The ornamental design for a package with an opening formed therein, as shown and described.

DESCRIPTION

FIG. 1 is a right front perspective view of a package with an opening formed therein, showing my new design;
FIG. 2 is a left front perspective view thereof;
FIG. 3 is a front elevational view thereof;
FIG. 4 is a rear elevational view thereof;
FIG. 5 is a right side elevational view thereof;
FIG. 6 is a left side elevational view thereof;
FIG. 7 is a top plan view thereof;
FIG. 8 is a bottom plan view thereof;
FIG. 9 is a right front perspective view of a second embodiment of a package with an opening formed therein, showing my new design;
FIG. 10 is a left front perspective view thereof;
FIG. 11 is a front elevational view thereof;
FIG. 12 is a rear elevational view thereof;
FIG. 13 is a right side elevational view thereof;
FIG. 14 is a left side elevational view thereof;
FIG. 15 is a top plan view thereof; and,
FIG. 16 is a bottom plan view thereof.
The broken line showing of the outside of a box and interior contents are included for the purpose of illustrating environmental structure and forms no part of the claimed design.

1 Claim, 8 Drawing Sheets

Figure 2:
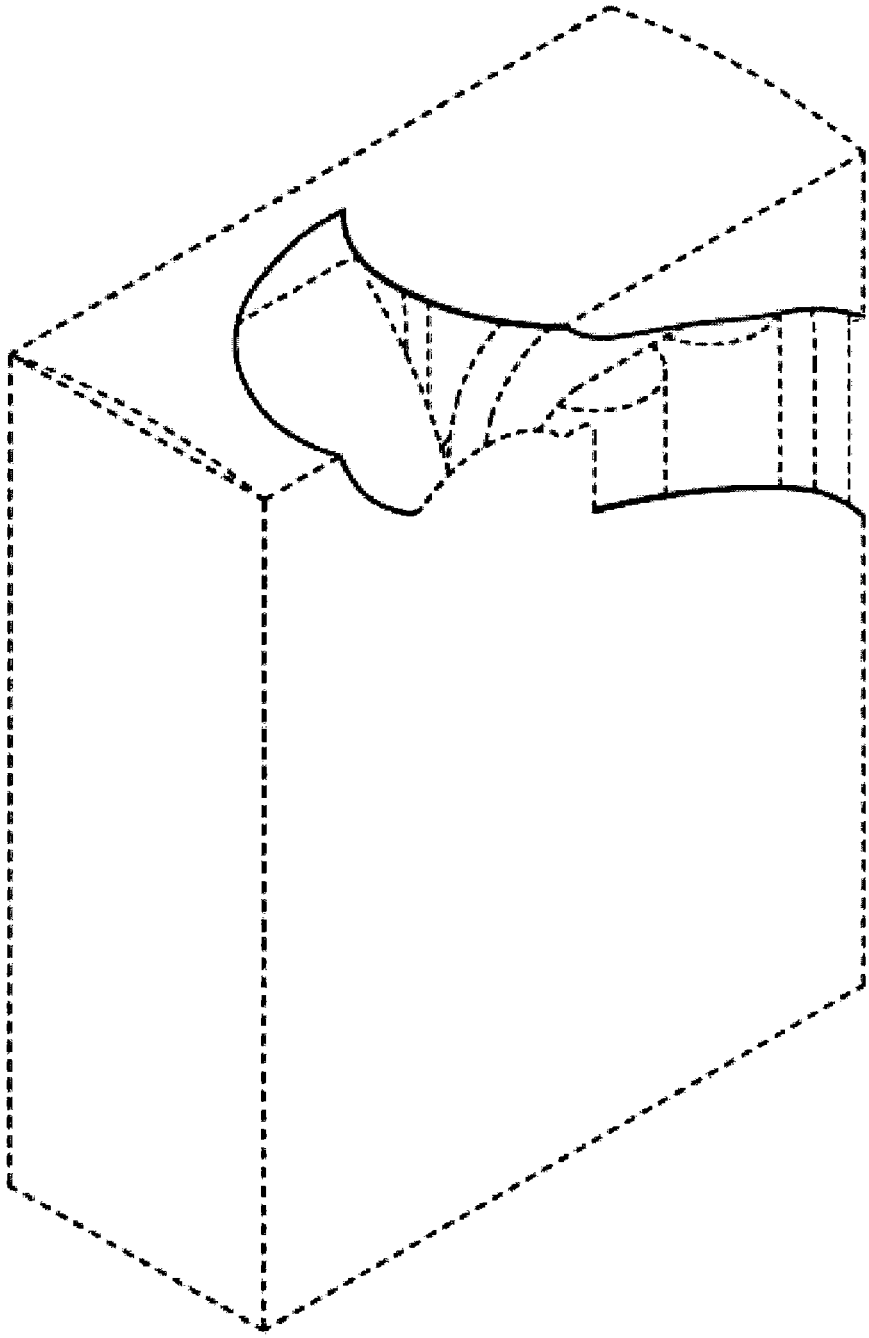
Figure 10:
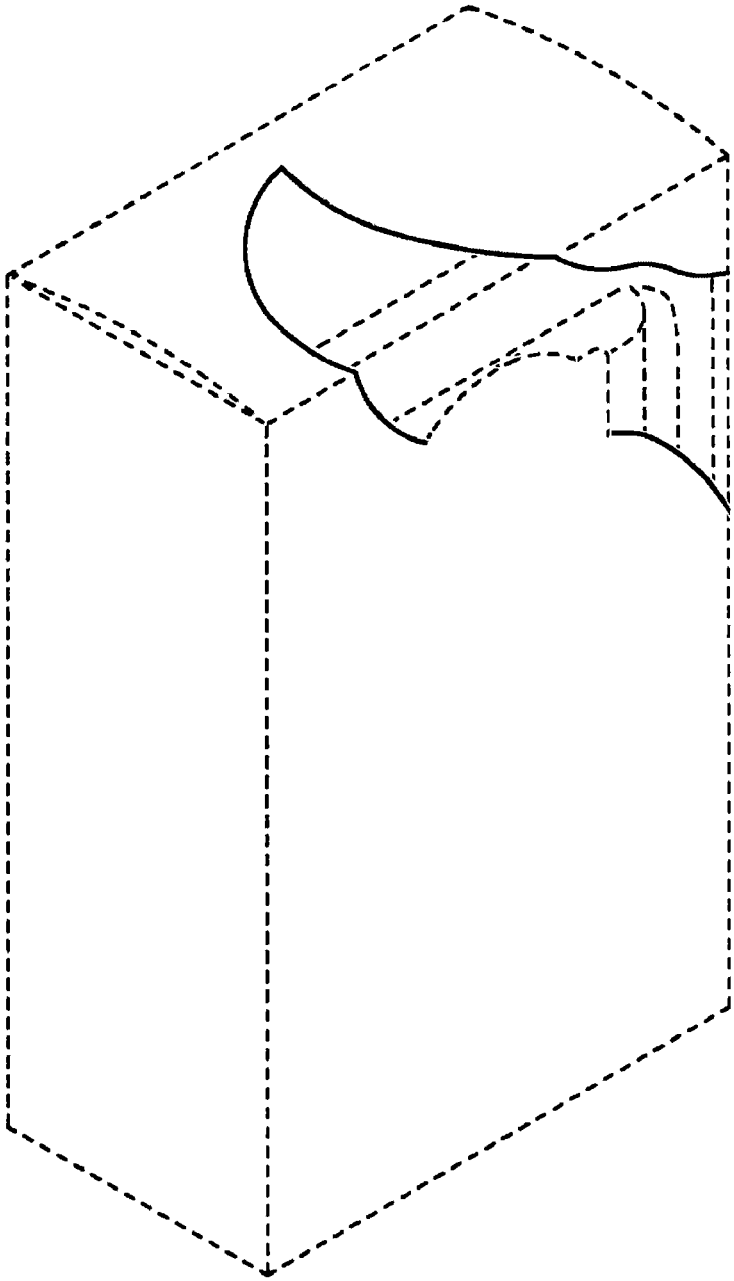

Matter enclosed in heavy brackets [ ] appears in the original patent, but forms no part of this reissue; matter printed in italics indicates the additions made by reissue.

Amended

Amended

Amended
FIG. 1
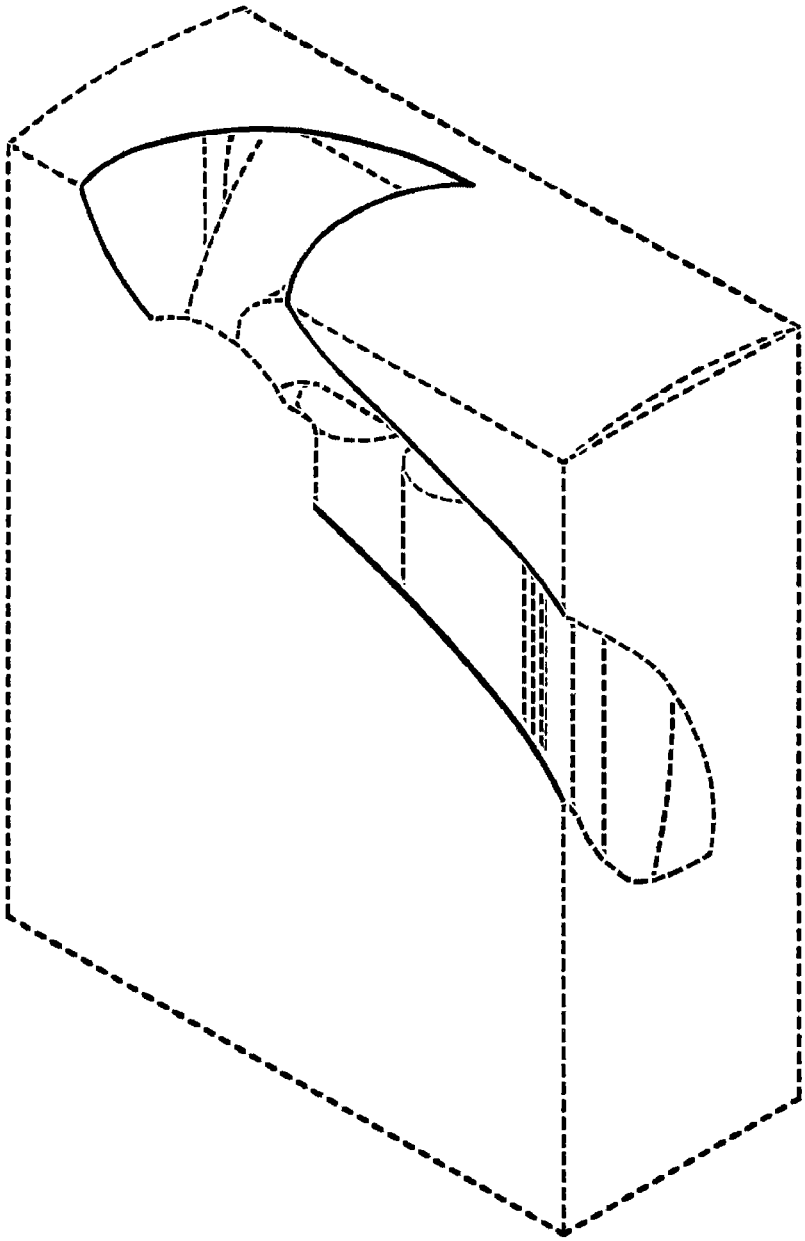

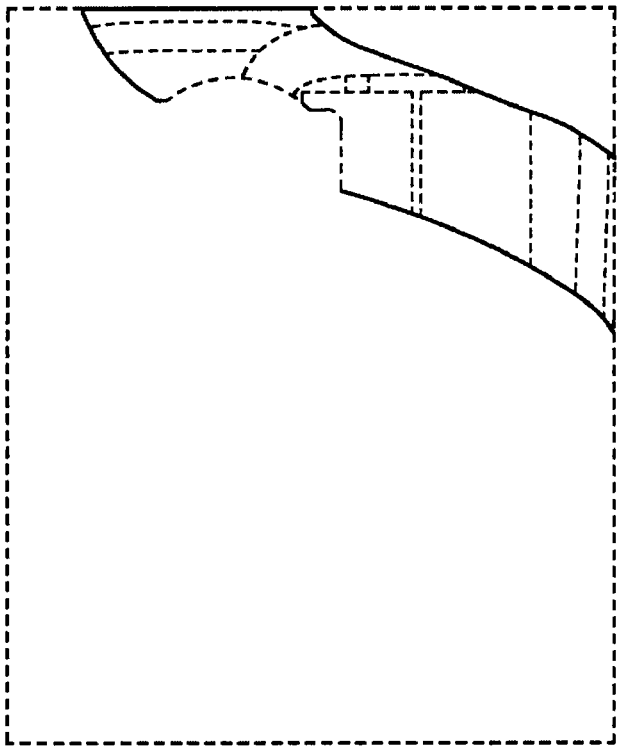
Amended
FIG. 3
FIG. 4
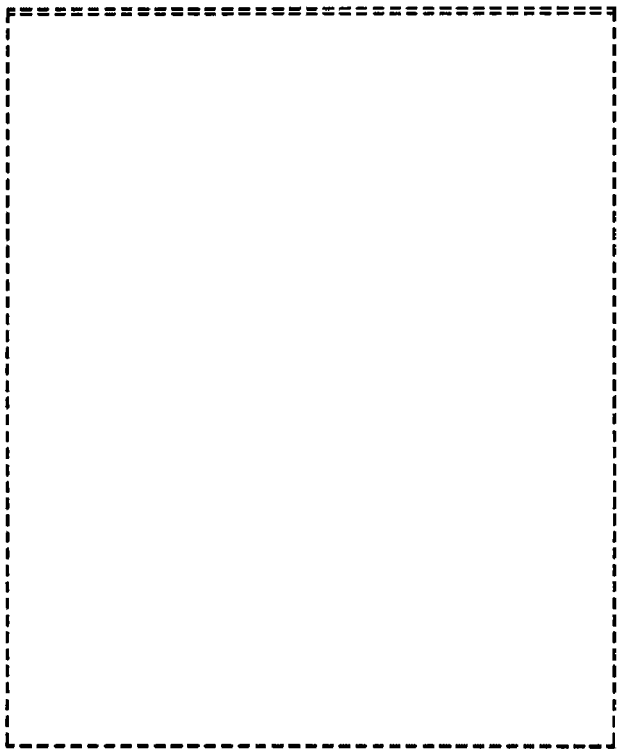

Amended
FIG. 5
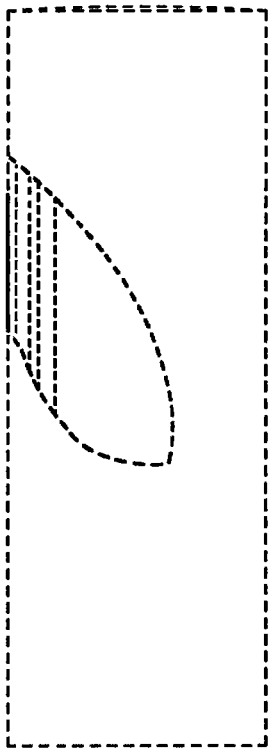
FIG. 6
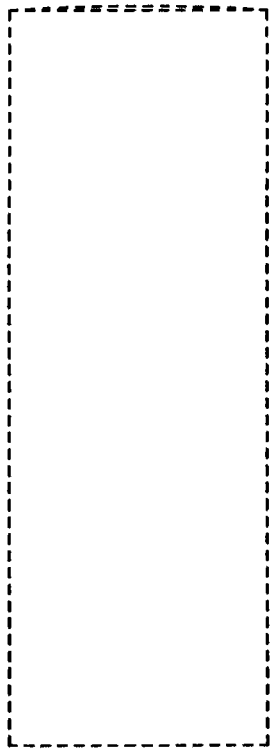
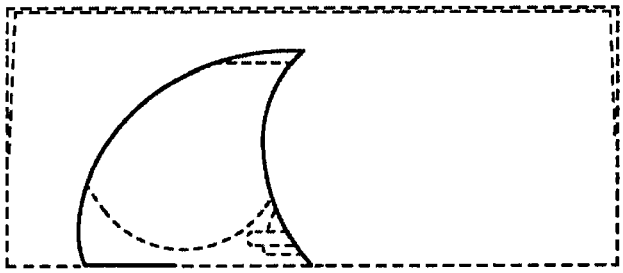
FIG. 7
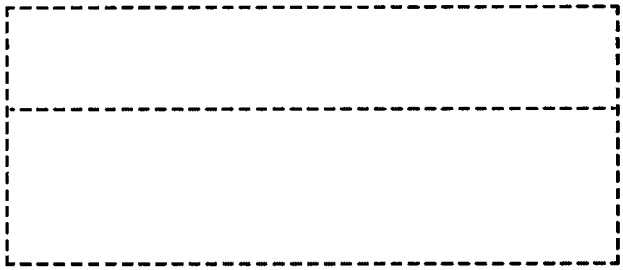
FIG. 8

Amended
FIG. 9
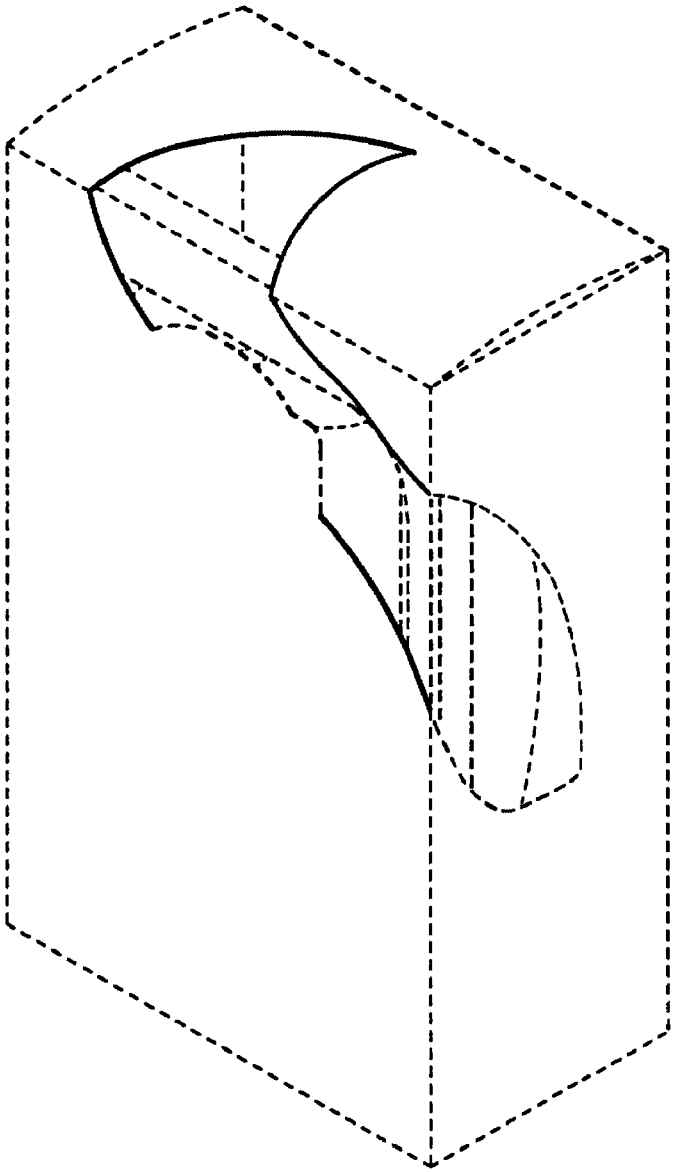

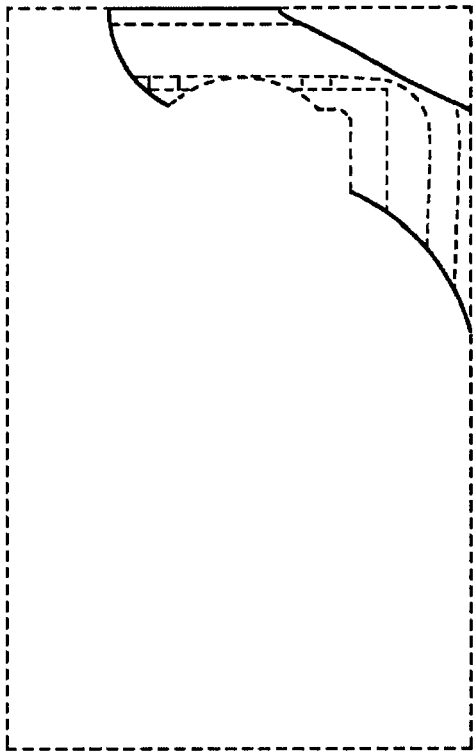
Amended
FIG. 11
FIG. 12
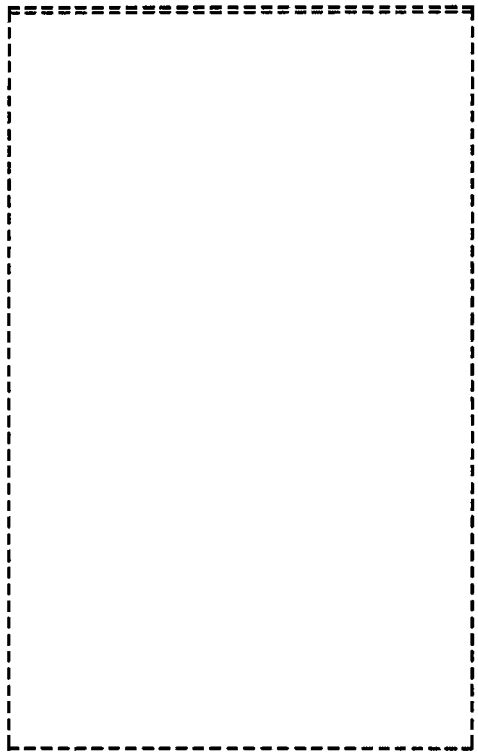

Amended
FIG. 13
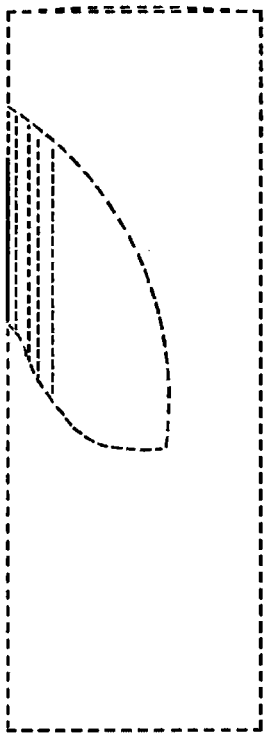
FIG. 14
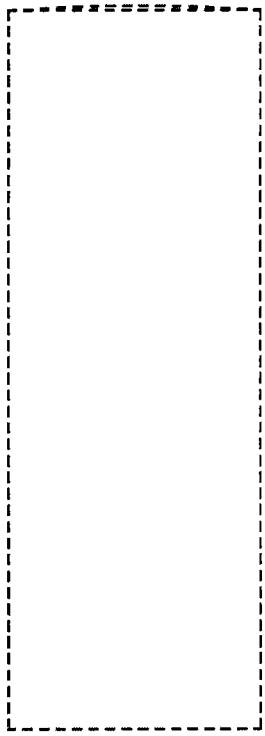
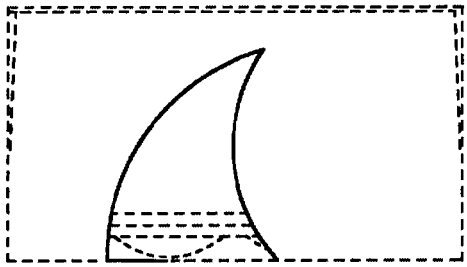
FIG. 15
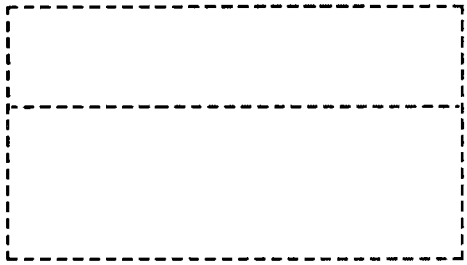
FIG. 16